(12) United States Patent
Islam et al.

(10) Patent No.: US 8,731,457 B2
(45) Date of Patent: May 20, 2014

(54) SYSTEM AND METHOD FOR LOCATING WIMAX OR LTE SUBSCRIBER STATIONS

(75) Inventors: Tariqul Islam, Germantown, MD (US); John Carlson, Dulles, VA (US)

(73) Assignee: Andrew LLC, Hickory, NC (US)

( * ) Notice: Subject to any disclaimer, the term of this patent is extended or adjusted under 35 U.S.C. 154(b) by 273 days.

(21) Appl. No.: 12/951,550

(22) Filed: Nov. 22, 2010

(65) Prior Publication Data

US 2012/0009950 A1    Jan. 12, 2012

Related U.S. Application Data

(63) Continuation of application No. PCT/US2009/043648, filed on May 12, 2009.

(60) Provisional application No. 61/055,658, filed on May 23, 2008.

(51) Int. Cl.
H04H 20/71    (2008.01)
H04W 24/00    (2009.01)

(52) U.S. Cl.
USPC ........ 455/3.01; 455/423; 455/456.3; 370/328

(58) Field of Classification Search
USPC ................... 455/3.01, 423, 456.3; 370/328
See application file for complete search history.

(56) References Cited

U.S. PATENT DOCUMENTS

| | | | |
|---|---|---|---|
| 5,564,079 A * | 10/1996 | Olsson | 455/456.3 |
| 6,097,709 A | 8/2000 | Kuwabara | |
| 6,108,558 A | 8/2000 | Vanderspool, II | |
| 6,115,605 A | 9/2000 | Siccardo et al. | |
| 6,269,246 B1 | 7/2001 | Rao et al. | |
| 6,281,834 B1 | 8/2001 | Stilp | |
| 6,393,294 B1 | 5/2002 | Perez-Breva et al. | |
| 6,449,486 B1 | 9/2002 | Rao | |
| 6,459,903 B1 | 10/2002 | Lee | |
| 6,591,112 B1 | 7/2003 | Siccardo et al. | |
| 6,782,265 B2 | 8/2004 | Perez-Breva et al. | |
| 6,944,465 B2 | 9/2005 | Spain et al. | |
| 7,116,987 B2 | 10/2006 | Spain, Jr. et al. | |
| 7,164,883 B2 * | 1/2007 | Rappaport et al. | 455/3.01 |

(Continued)

FOREIGN PATENT DOCUMENTS

KR    2002-0092101 A    12/2002

OTHER PUBLICATIONS

International Searching Authority, International Preliminary Report on Patentability Written Opinion for related international application PCT/US2009/043648, dated Dec. 2, 2010.

(Continued)

*Primary Examiner* — William D Cumming
(74) *Attorney, Agent, or Firm* — Duane Morris LLP

(57) ABSTRACT

A system and method for estimating a location of a subscriber station receiving a first signal from a first base station and receiving a second signal from a second base station where the first and second base stations are nodes in a WiMAX or LTE network. A message may be received from the subscriber station containing first and second information, and a range ring determined from the first base station using the first information. A location hyperbola may be determined using the second information wherein the location hyperbola has the first and second base stations as foci. A location of the subscriber station may be estimated using the range ring and the location hyperbola.

16 Claims, 14 Drawing Sheets

(56) References Cited

U.S. PATENT DOCUMENTS

| | | |
|---|---|---|
| 7,167,714 B2 | 1/2007 | Dressler et al. |
| 7,233,799 B2 | 6/2007 | Spain, Jr. |
| 7,250,907 B2 | 7/2007 | Krumm et al. |
| 7,257,414 B2 | 8/2007 | Spain, Jr. et al. |
| 7,383,051 B2 | 6/2008 | Spain, Jr. et al. |
| 7,433,652 B2 | 10/2008 | Durgin |
| 7,433,695 B2 | 10/2008 | Gordon et al. |
| 7,460,505 B2 | 12/2008 | Spain |
| 7,725,111 B2 | 5/2010 | Dressler et al. |
| 7,734,298 B2 | 6/2010 | Bhattacharya et al. |
| 7,753,278 B2 | 7/2010 | Spain, Jr. et al. |
| 7,796,966 B2 | 9/2010 | Bhattacharya et al. |
| 7,848,762 B2 | 12/2010 | Gordon et al. |
| 7,899,467 B2 | 3/2011 | Feuerstein et al. |
| 8,013,785 B2 | 9/2011 | Bhattacharya et al. |
| 8,068,802 B2 | 11/2011 | Bhattacharya et al. |
| 8,068,855 B2 | 11/2011 | Dressler et al. |
| 8,106,817 B2 | 1/2012 | Bhattacharya et al. |
| 8,106,818 B2 | 1/2012 | Bhattacharya et al. |
| 8,155,394 B2 | 4/2012 | Allegra et al. |
| 2003/0134631 A1* | 7/2003 | Snyder et al. ............... 455/423 |
| 2004/0203539 A1 | 10/2004 | Benes et al. |
| 2006/0176849 A1* | 8/2006 | Gass ............................ 370/328 |

OTHER PUBLICATIONS

Rick Roberts, "Project: IEEE P802.15 Working Group for Wireless Personal Area Networks (WPANS)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

\* cited by examiner

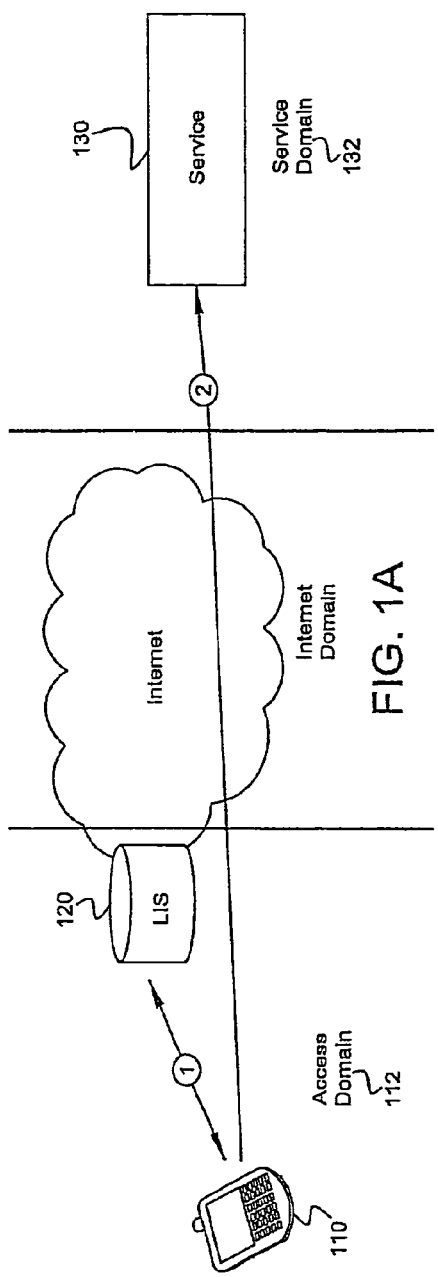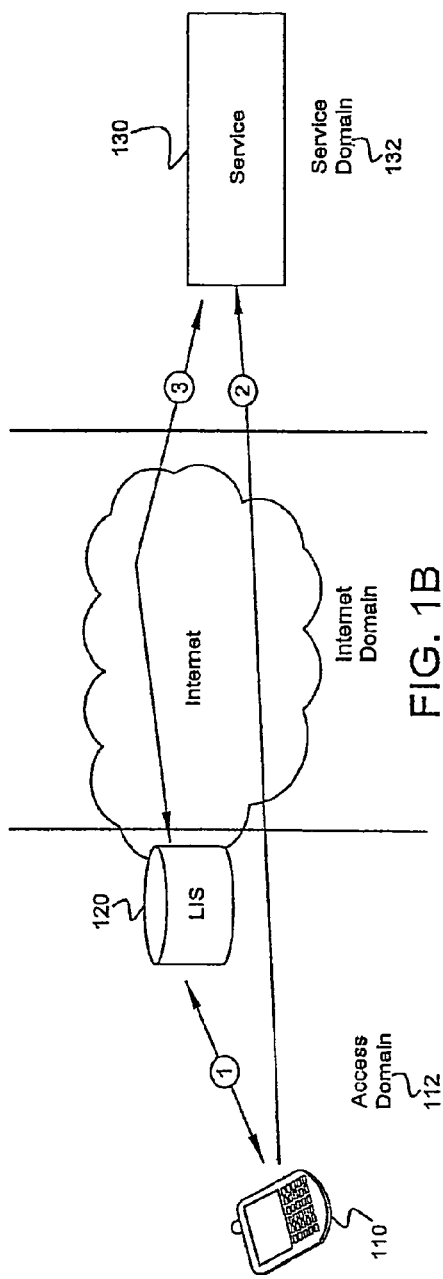

SYSTEM AND METHOD FOR LOCATING WIMAX OR LTE SUBSCRIBER STATIONS

RELATED APPLICATIONS

The instant application is a PCT national phase application of and claims priority benefit of PCT International Application Number PCT/US2009/043648 having an international filing date of 12 May 2009 and entitled "System and Method for Locating WiMAX or LTE Subscriber Stations", which claims priority benefit of U.S. Provisional Application No. 61/055,658, entitled, "WiMAX Mobile Location Method," filed 23 May 2008, the entirety of each is hereby incorporated herein by reference. Additionally, the instant application is related to and concurrently filed with U.S. application Ser. No. 12/951,474 and U.S. application Ser. No. 12/951,499 each of which claim priority benefit of PCT International Application Number PCT/US2009/043648 and U.S. Provisional Application No. 61/055,658, the entirety of each of the above-mentioned applications is hereby incorporated herein by reference.

BACKGROUND

The location of a mobile, wireless or wired device is a useful and sometimes necessary part of many services. A Location Information Server ("LIS") may be responsible for providing location information to such devices with an access network. The LIS may utilize knowledge of the access network and its physical topology to generate and serve location information to devices.

The LIS, in general terms, is a network node originally defined in the National Emergency Number Association ("NENA") i2 network architecture addressing a solution for providing E-911 service for users of Voice over Internet Protocol ("VoIP") telephony. In VoIP networks, the LIS is the node that determines the location of the VoIP terminal. Beyond the NENA architecture and VoIP, the LIS is a service provided by an access network provider to supply location information to users of the network by utilizing knowledge of network topology and employing a range of location determination techniques to locate devices attached to the network. The precise methods used to determine location are generally dependent on the type of access network and the information that can be obtained from the device. For example, in a wired network, such as Ethernet or DSL, a wiremap method is commonplace. In wiremap location determination, the location of a device may be determined by finding which cables are used to send packets to the device. This involves tracing data through aggregation points in the network (e.g., Ethernet switches, DSL access nodes) and finding the port for which packets are sent to the device. This information is combined with data available to the LIS (generally extracted from a database) to determine a final location of the device.

In wireless networks, a range of technologies may be applied for location determination, the most basic of which uses the location of the radio transmitter as an approximation. The Internet Engineering Task Force ("IETF") and other standards forums have defined various architectures and protocols for acquiring location information from an LIS. In such networks, an LIS may be automatically discovered and location information retrieved using network specific protocols. Location information may be retrieved directly or the LIS may generate temporary uniform resource identifiers ("URI") utilized to provide location indirectly (i.e., location URI). Geodetic, civic positions and location URIs for a mobile device may be determined as a function of location information from the LIS. A request for geodetic and/or civic locations may provide location information at the time the location request is made. A location URI may generally be passed to another party which can utilize it to retrieve the target device's location at a later time, typically from the same location server that provided the location URI.

A few exemplary wireless networks are a World Interoperability for Microwave Access ("WiMAX") network and a Long Term Evolution ("LTE") network. Generally, WiMAX is intended to reduce the barriers to widespread broadband access deployment with standards-compliant wireless solutions engineered to deliver ubiquitous fixed and mobile services such as Voice over IP ("VoIP"), messaging, video, streaming media, and other IP traffic. WiMAX enables delivery of last-mile broadband access without the need for direct line of sight. Ease of installation, wide coverage, and flexibility makes WiMAX suitable for a range of deployments over long-distance and regional networks, in addition to rural or underdeveloped areas where wired and other wireless solutions are not easily deployed and line of sight coverage is not possible.

LTE is generally a 4G wireless technology and is considered the next in line in the GSM evolution path after UMTS/HSPDA 3G technologies. LTE builds on the 3GPP family including GSM, GPRS, EDGE, WCDMA, HSPA, etc., and is an all-IP standard like WiMAX. LTE is based on orthogonal frequency division multiplexing ("OFDM") Radio Access technology and multiple input multiple output ("MIMO") antenna technology. LTE provides higher data transmission rates while efficiently utilizing the spectrum thereby supporting a multitude of subscribers than is possible with pre-4G spectral frequencies. LTE is all-IP permitting applications such as real time voice, video, gaming, social networking and location-based services. LTE networks may also co-operate with circuit-switched legacy networks and result in a seamless network environment and signals may be exchanged between traditional networks, the new 4G network and the Internet seamlessly.

The original version of the standard on which WiMAX is based (IEEE 802.16) specified a physical layer operating in the 10 to 66 GHz range. 802.16a, updated in 2004 to 802.16-2004, added specifications for the 2 to 11 GHz range. 802.16-2004 was updated by 802.16e-2005 in 2005 and uses scalable orthogonal frequency division multiple access ("SOFDMA") as opposed to the OFDM version with 256 sub-carriers (of which 200 are used) in 802.16d. More advanced versions, including 802.16e, also bring Multiple Antenna Support through MIMO functionality. This brings potential benefits in terms of coverage, self installation, power consumption, frequency re-use and bandwidth efficiency. Furthermore, 802.16e also adds a capability for full mobility support. Most commercial interest is in the 802.16d and 802.16e standards, since the lower frequencies used in these variants suffer less from inherent signal attenuation and therefore gives improved range and in-building penetration. Already today, a number of networks throughout the world are in commercial operation using WiMAX equipment compliant with the 802.16d standard.

The WiMAX Forum has provided an architecture defining how a WiMAX network connects with other networks, and a variety of other aspects of operating such a network, including address allocation, authentication, etc. It is important to note that a functional architecture may be designed into various hardware configurations rather than fixed configurations.

For example, WiMAX architectures according to embodiments of the present subject matter are flexible enough to allow remote/mobile stations of varying scale and functionality and base stations of varying size. The art of WiMAX and LTE subscriber station (SS) location, however, is still in its infancy, and the current standards do not define how to solve the WiMAX and LTE location problems using network measurement messages utilized by the respective networks for normal operation. Thus, there is a need in the art to overcome the limitations of the prior art and provide a novel system and method for locating WiMAX and LTE subscriber stations.

One embodiment of the present subject matter provides a method for estimating a location of a subscriber station receiving a first signal from a first base station and receiving a second signal from a second base station where the first and second base stations are nodes in a WiMAX or LTE network. The method may comprise receiving from the subscriber station a message containing a first information and a second information, and determining a range ring from the first base station using the first information. A location hyperbola may be determined using the second information wherein the location hyperbola has the first and the second base stations as foci. A location of the subscriber station may then be estimated using the range ring and location hyperbola.

Another embodiment of the present subject matter may provide a method for estimating a location of a subscriber station receiving a first signal from a first base station, receiving a second signal from a second base station, and receiving a third signal from a third base station where the first, second, and third base stations are nodes in a WiMAX or LTE network. The method may comprise receiving from the subscriber station a message containing a first information and a second information, and determining a range ring from the first base station using the first information. A location hyperbola may be determined using the second information wherein the location hyperbola has the second and the third base stations as foci. A location of the subscriber station may then be estimated using the range ring and the location hyperbola.

A further embodiment of the present subject matter provides a method for estimating a location of a subscriber station receiving a signal from a base station where the base station is a node in a WiMAX or LTE network. The method may comprise receiving from said subscriber station a message containing a first information and a second information, and determining a range ring from the base station using the first information. A serving sector of the base station may be determined for the subscriber station, and plural sub-sectors determined for the serving sector. From the second information a carrier-to-interference noise ratio ("CINR") may be determined for each of a first and a second neighboring sector to the serving sector. A most likely sub-sector may also be determined from the plural sub-sectors based on a comparison of the CINR for the first and second neighboring sectors. A location of the subscriber station may then be estimated as a point of intersection of the range ring and a bisector of the most likely sub-sector.

One embodiment of the present subject matter provides a method for estimating a location of a subscriber station operating in a wireless network. The method may comprise the steps of transmitting from a network location device to a first base station a request for network measurement data, and transmitting from the first base station to the subscriber station a message to trigger the subscriber station to scan the wireless network. A scanning result message containing information characterizing the first base station and a second base station may be transmitted from the subscriber station to the first base station, and information from the scanning result message transmitted from the first base station to the network location device. A location for the subscriber station may then be estimated at the network location device based at least on the information from the scanning result message.

A further embodiment of the present subject matter provides a system for estimating a location of a subscriber station receiving a first signal from a first base station and receiving a second signal from a second base station where the first and second base stations are nodes in a WiMAX or LTE network. The system may include a receiver for receiving from the subscriber station a message containing a first information and a second information, and circuitry for determining a range ring from the first base station using the first information. The system may also include circuitry for determining a location hyperbola using the second information wherein the location hyperbola has the first and second base stations as foci. The system may include circuitry for estimating a location of the subscriber station using the range ring and the location hyperbola.

Another embodiment of the present subject matter provides a system for estimating a location of a subscriber station receiving a first signal from a first base station, receiving a second signal from a second base station, and receiving a third signal from a third base station where the first, second, and third base stations are nodes in a WiMAX or LTE network. The system may comprise a receiver for receiving from the subscriber station a message containing a first information and a second information, and circuitry for determining a range ring from the first base station using the first information. The system may also comprise circuitry for determining a location hyperbola using the second information wherein the location hyperbola has the second and third base stations as foci. The system may comprise circuitry for estimating a location of the subscriber station using the range ring and location hyperbola.

Yet another embodiment of the present subject matter provides a system for estimating a location of a subscriber station receiving a signal from a base station where the base station is a node in a WiMAX or LTE network. The system may comprise a receiver for receiving from the subscriber station a message containing a first information and a second information, and circuitry for determining a range ring from the base station using the first information. The system may also include circuitry for determining a serving sector of the base station for the subscriber station, and circuitry for determining plural sub-sectors for the serving sector. The system may include circuitry for determining from the second information a CINR for each of a first and a second neighboring sector to the serving sector, and circuitry for determining a most likely sub-sector from the plural sub-sectors based on a comparison of the CINR for the first and second neighboring sectors. The system may further include circuitry for estimating a location of the subscriber station as a point of intersection of the range ring and a bisector of the most likely sub-sector.

One embodiment of the present subject matter provides a system for estimating a location of a subscriber station operating in a wireless network. The system may include a network location device including a first transmitter for transmitting to a first base station a request for network measurement data where the first base station includes a second transmitter to transmit to the subscriber station a message to trigger the subscriber station to scan the wireless network. The subscriber station may include a third transmitter to transmit to the first base station a scanning result message containing information characterizing the first base station and a second base station. The first base station may include a fourth transmitter to transmit to the network location device information from the scanning result message. The system may also include circuitry for estimating at the network location device a location for the subscriber station based at least on the information from the scanning result message.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

FIGS. 1A-1C are diagrams of Internet location services models.

DETAILED DESCRIPTION

Figure 1C:
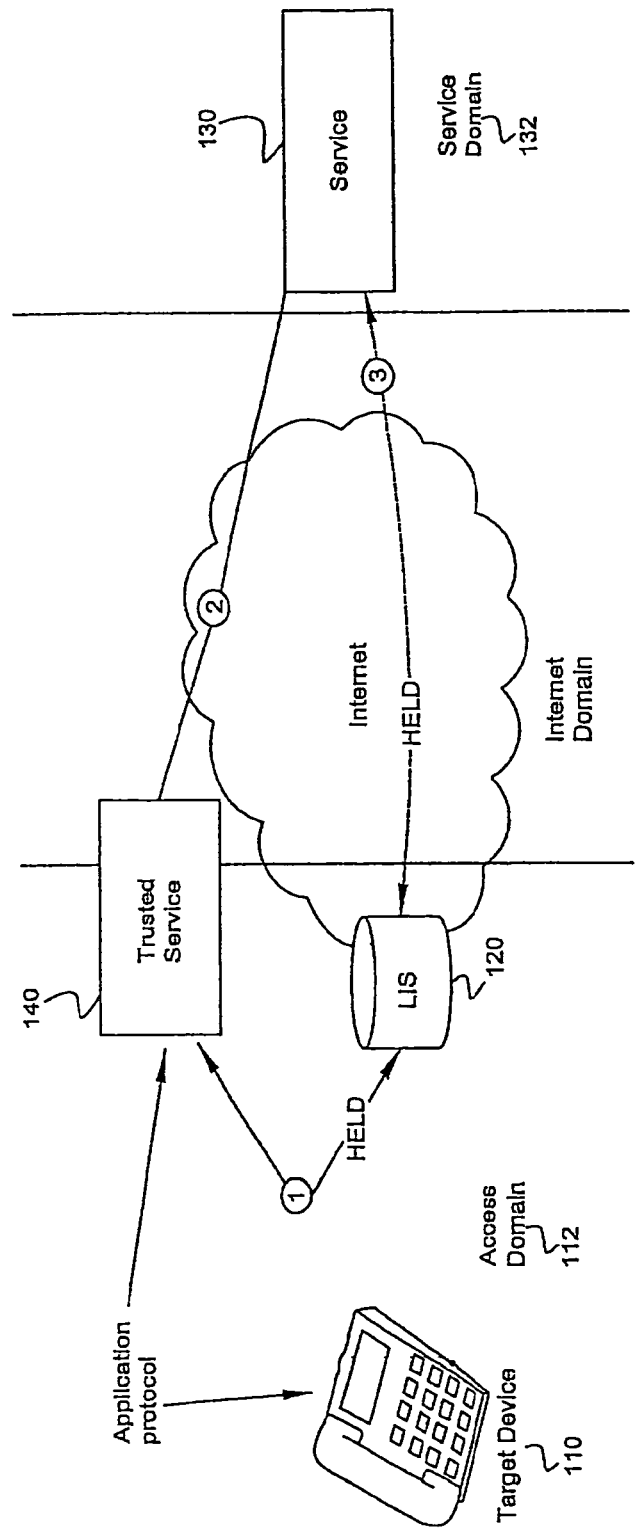

With reference to the figures where like elements have been given like numerical designations to facilitate an understanding of the present subject matter, the various embodiments of a system and method for locating a WiMAX or LTE subscriber station are herein described.

Generally, a WiMAX or LTE subscriber station may provide to a communications network round trip delay ("RTD") information of an anchor base station's downlink and uplink signals and the observed relative delays of the neighboring base stations' downlink and uplink signals. The phrases subscriber station and mobile station are used interchangeably throughout this document and such should not limit the scope of the claims appended herewith. Further, the terms station and device are used interchangeably throughout this document and such should not limit the scope of the claims appended herewith. The respective WiMAX or LTE network may utilize this data for hand-off operations; however, embodiments of present subject matter may determine from this data a range ring from the anchor or serving base station ("BS") and location hyperbolas between the reported BSs, if the BS timings are known.

As generally discussed above, the Location Information Server ("LIS") is a network server that provides devices with information about their location. The phrases and respective acronyms of Location Information Server ("LIS") and Location Server ("LS") are used interchangeably throughout this document and such should not limit the scope of the claims appended herewith. Devices that require location information are able to request their location from the LIS. In the architectures developed by the IETF, NENA and other standards forums, the LIS may be made available in an IP access network connecting one or more target devices to the Internet. In other modes of operation, the LIS may also provide location information to other requesters relating to a target device. To determine location information for a target device, an exemplary LIS may utilize a range of methods. The LIS may use knowledge of network topology, private interfaces to networking devices like routers, switches and base stations, and location determination algorithms. Exemplary algorithms may include known algorithms to determine the location of a mobile device as a function of satellite information, satellite assistance data, various downlink or uplink algorithms such as, but not limited to, time difference of arrival ("TDOA"), time of arrival ("TOA"), angle of arrival ("AOA"), round trip delay ("RTD"), signal strength, advanced forward link trilateration ("AFLT"), enhanced observed time difference ("EOTD"), observed time difference of arrival ("OTDOA"), uplink-TOA and uplink-TDOA, enhanced cell/sector and cell-ID, etc., and hybrid combinations thereof.

A location server according to an embodiment of the present subject matter may utilize a range of inputs to determine location information for the target device. For example, from a request made of the location server, the location server may determine one or more parameters, e.g., Internet Protocol ("IP") and Media Access Control ("MAC") addresses, that uniquely identify the target mobile device. This identification information may be used as an input to an exemplary measurement collection process that produces further information in the form of measurements or measurement results. Measurement information may also be data already known to the location server, additional parameters that identify the target mobile device in other ways, and/or parameters relating to the network attachment of the target mobile device. Non-limiting examples include the MAC address of the device, the identity of network nodes from which network traffic to and from the device transits (including any physical connections involved), the location of network intermediaries (e.g., wiring maps), radio timing, signal strength measurements and other terrestrial radio frequency information, and network configuration parameters, to name a few.

Protocols such as Flexible LIS-ALE Protocol ("FLAP") are being developed in the Alliance for Telecommunications Industry Solutions ("ATIS") forum to provide a formal definition of location-related measurements for different types of access networks. FLAP generally facilitates transfer of values of location measurement parameters from a network to the LIS to enable the latter to compute the location of an IP end-device. The LIS may interact with an Access Location Entity ("ALE") residing in an access network to retrieve location measurements. Location information may be retrieved directly or the LIS may generate temporary uniform resource identifiers ("URI") utilized to provide location indirectly (i.e., location URI). Geodetic, civic positions and location URIs for a mobile device may be determined as a function of location information from the US.

There are many models in which an LIS may be utilized. For example, FIGS. 1A-1C provide three examples of an Internet location services model for an LIS. With reference to FIG. 1A, a location by value model is provided in which a target or mobile device 110 may obtain a location from a location server 120 in a respective access network or domain 112. The device 110 may then convey its location to a location based service 130 in the service domain 132 using an appropriate application protocol. With reference to FIG. 1B, a location by reference model is provided in which a mobile device 110 may obtain a reference from the location server 120 in the respective access network or domain 112. The device 110 may convey the reference to the location based service 130 in the service domain using an appropriate application protocol. The service 130 may then query the location server 120 direct for location values for the device 110. Generally the protocol utilized for communication between the device 110 and location server 120 is HTTP Enabled Location Delivery ("HELD") and the protocol utilized for communication between the location server 120 and the service 130 is HELD. The protocol utilized for communication between the device 110 and the service 130 is application protocol dependent.

With reference to FIG. 1C, an on-behalf-of ("OBO") location model is provided in which a trusted third party application or service 140 queries for the location of a device 110. A client identity, which is understood by the location server 120, may be used as a query parameter (e.g., IP or MAC address). If applicable, the third party 140 may provide location information to external service entities 130. If the location was requested and provided by reference, the external entity 130 may query back to the location server 120 for location value updates using the HELD protocol. The above described Internet location services models illustrate how LIS clients may request and receive location information from the LIS. The value of parameters derived from such a communications network may be used by the device and may be used by the LIS to determine location. In order to make use of these parameters, it is necessary for their values to be transferred form the communication network elements to the LIS, which is one purpose of FLAP.

Figure 2:
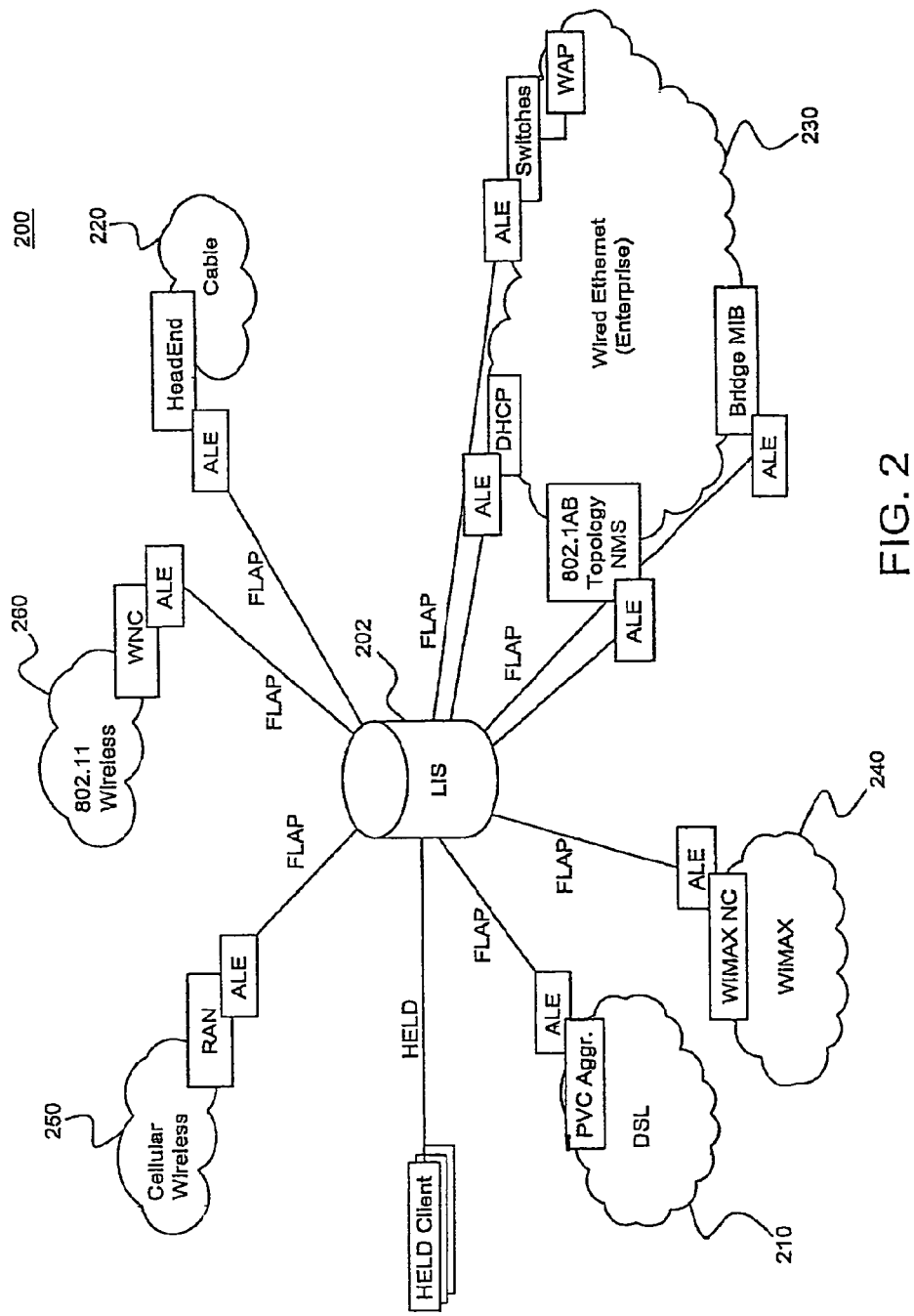
FIG. 2 is a diagram of an exemplary access network model.

FIG. 2 is a diagram of an exemplary access network model. With reference to FIG. 2, an exemplary access network model 200 may include one or more LISs 202 connected to one or more access networks, 210-260. An access network refers to a network that provides a connection between a device and the Internet. This may include the physical infrastructure, cabling, radio transmitters, switching and routing nodes and servers. The access network may also cover services required to enable IP communication including servers that provide addressing and configuration information such as DHCP and DNS servers. Examples of different types of access networks include, but are not limited to, DSL 210, cable 220, WiFi, wired Ethernet 230, WiMAX 240, cellular packet services 250, and 802.11 wireless 260, LTE, among others. An exemplary LIS 202 may be implemented on multiple processing units, any one of which may provide location information for a target device from a first site, a second site and/or additional sites. Therefore, an exemplary LIS 202 may provide high availability by having more than one processing unit at a first site and by having multiple processing units at a second site for copying or backup purposes in the event a site or a processing unit fails.

Figure 3:
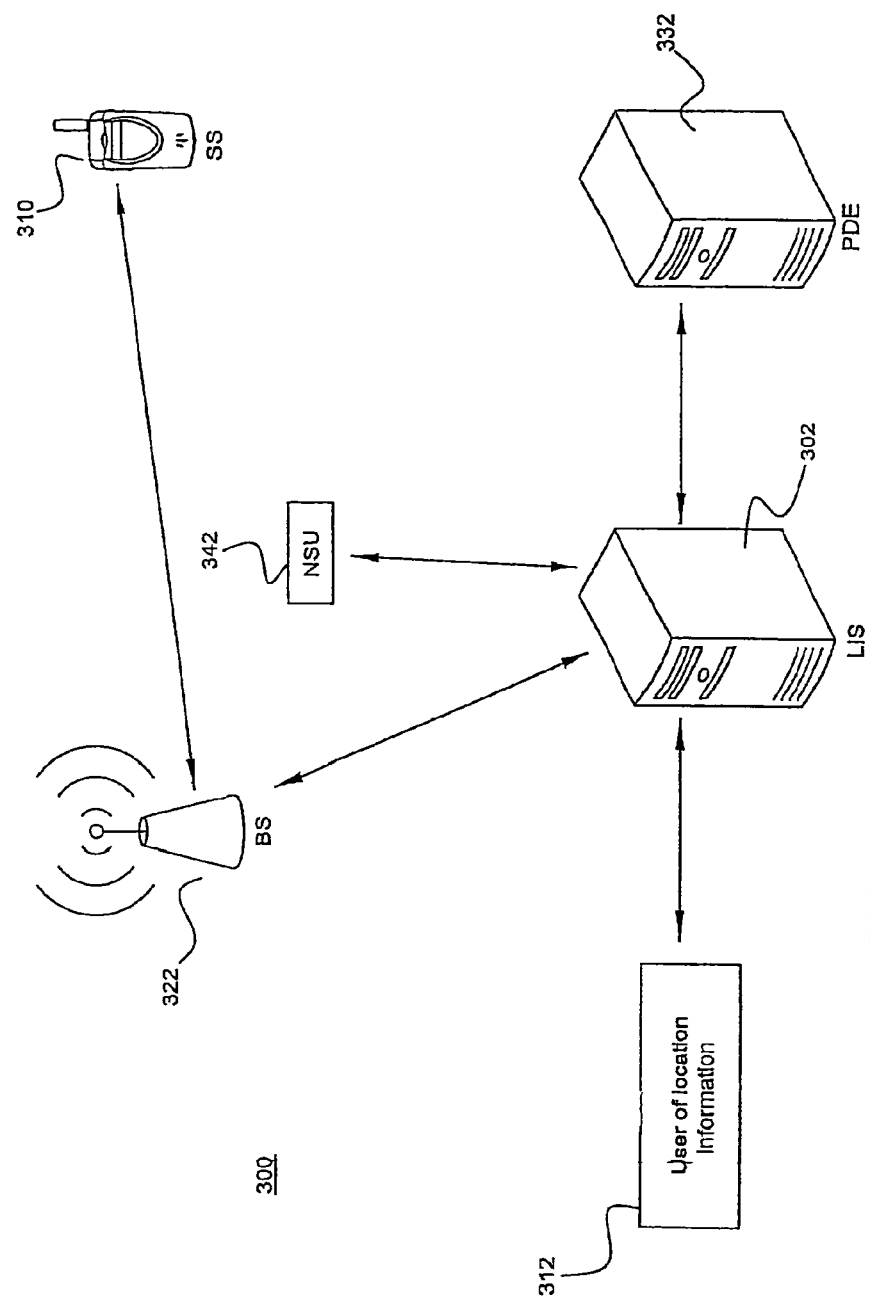
FIG. 3 is a high level diagram of one embodiment of the present subject matter.

FIG. 3 is a high level diagram of one embodiment of the present subject matter. With reference to FIG. 3, an exemplary wireless network or system 300 may include an LIS 302 in communication with one or more base stations ("BS") 322, a positioning determining entity ("PDE") 332, and one or more network synchronization units ("NSU") 342. One or more mobile or subscriber stations or devices 310 may be in communication with the LIS 302 via the one or more BSs 322. A recipient or user 312 of location information may request the LIS 302 to locate a subscriber station 310. The LIS 302 may then request the serving BS 322 to provide network measurement information. The BS 322 receives the data from the target subscriber station 310 and provides the data to the LIS 302. The LIS 302 may, in one embodiment, send the data to the PDE 332 to compute the location of the target station or device 310. Once the location is computed, the LIS 302 may provide the location information to the requesting user 312.

Figure 4:
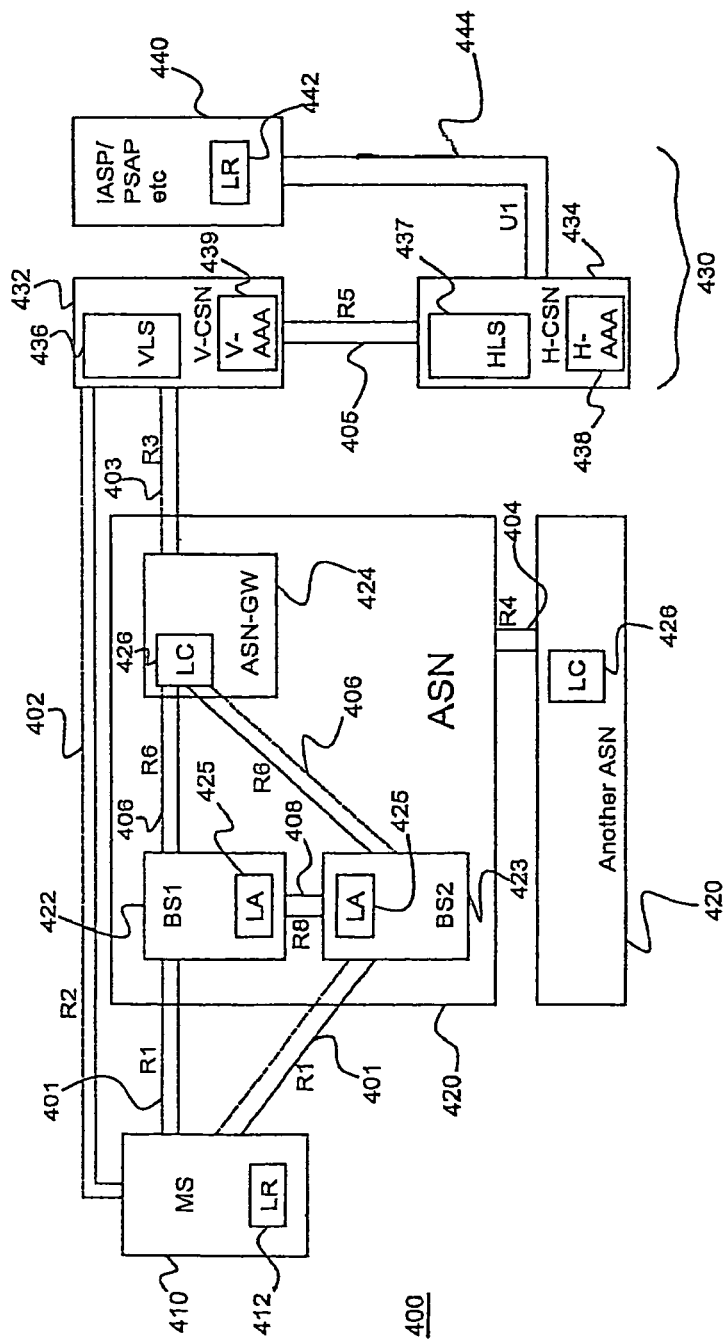
FIG. 4 is a more detailed diagram of an exemplary WiMAX Location Based Service network architecture.

FIG. 4 is a more detailed diagram of an exemplary WiMAX Location Based Service ("LBS") network architecture 400. With reference to FIG. 4, the WiMAX forum defines a number of functional entities and interfaces between those entities. An exemplary network architecture 400 includes one or more access service networks ("ASN") 420, each having one or more base stations ("BS") 422, 423 and one or more ASN gateways ("ASN-GW") 424 forming the radio access network at the edge thereof. One or more mobile stations or devices 410, such as a WiMAX device, having a location requester 412 may be in communication with the ASN 420 via one or more BSs 422, 423 over an R1 interface 401. BSs 422, 423 are responsible for providing the air interface to the MS 410. Additional functions may, of course, be part of BSs 422, 423, such as micromobility management functions, handoff triggering, tunnel establishment, radio resource management, QoS policy enforcement, traffic classification, Dynamic Host Control Protocol ("DHCP") proxy, key management, session management, and multicast group management, to name a few. BSs 422, 423 communicate with one another via resident location agents ("LA") 425 over an R8 interface 408. LAs 425 are generally responsible for measurements and reporting and may communicate with the device 410 to collect measurements. BSs 422, 423 also communicate with the ASN-GWs 424 via a location controller ("LC") 426 in the ASN-GW 424 over an R6 interface 406. LCs 426 generally trigger and collect location measurements and forward these measurements to a location server ("LS") in a selected connectivity service network ("CSN") 430.

The ASN-GW 424 generally acts as a layer 2 traffic aggregation point within an ASN 420. Additional functions that may be part of the ASN-GW 424 include, but are not limited to, intra-ASN location management and paging, radio resource management and admission control, caching of subscriber profiles and encryption keys, AAA client functionality, establishment and management of mobility tunnel with BSs, QoS and policy enforcement, foreign agent functionality for mobile IP and routing to a selected CSN. Communication between ASNs 420 occurs over an R4 interface 404. It should also be noted that a Public Safety Answering Point ("PSAP") or an Internet Application Service Provider ("iASP") 440 may also include a location requester 442 and may be in communication with a home CSN 434 over a U1 interface 444.

A third portion of the network includes the CSN 430. The CSN may be a visited network having a visited-CSN ("V-CSN") 432 or a home network having a home-CSN ("H-CSN") 434, collectively CSNs 430. These CSNs 430 provide IP connectivity and generally all the IP core network functions in the network 400. For example, the CSN 430 provides connectivity to the Internet, ASP, other public networks and corporate networks. The CSN 430 is owned by a network service provider ("NSP") and includes Authentication Authorization Access ("AAA") servers (home-AAA 438 and visited-AAA 439 servers) that support authentication for the devices, users, and specific services. Similar to other networks, home and visited AAA servers 438, 439 provide the following core functions in a WiMAX network: Authentication—Confirmation that a user requesting a network service is entitled to do so. This involves presentation of an identity and credentials such as a user name, password, and/or digital certificate. This also requires support for device authentication; Authorization—The granting of specific types of service (or "no service") to a user based on his/her authentication, the services requested, and the current system state; and Accounting—The tracking of network resource consumption by users. In the WiMAX Forum's NWG Stage 3 Release 1.0.0 specification, AAA is specified as a basic building block. It also includes some functions that are not typically supported in other AAA deployments, such as Wi-Fi. This version of the standard is focused on the use of AAA in Mobile WiMAX, including support for mobile IP. Fixed WiMAX, as well as Wi-Fi, conventionally utilizes RADIUS AAA, Extensible Authentication Protocol ("EAP"), or a custom authentication method. Authorization attributes returned are similar to those returned for common Wi-Fi deployments.

The CSN 430 also provides per user policy management of QoS and security. The CSN 430 is also responsible for IP address management, support for roaming between different NSPs, location management between ASNs 420, and mobility and roaming between ASNs 420, to name a few. Communication between the ASN 420 and a CSN 430 occurs via the respective ASN-GW 424 over an R3 interface 403.

One entity within a CSN 430 is a LIS or location server ("LS"). Depending upon whether the device 410 is roaming and in direct communication with a remote network or in direct communication with a home network, the LS may be a visited-LS ("V-LS") 436 or a home-LS ("H-LS") 437. The role of the LS is to provide location information about a WiMAX device 410 in the network 400. Communication between the WiMAX device 410 and the LS 436, 437 is performed over an R2 interface 402. The WiMAX forum explicitly allows the use of OMA SUPL 2.0 over the R2 interface 402. WiMAX provides a roaming architecture where a device has a home network but may connect to a network provided by a different operator, such as a visited network. In this mode of operation two location servers may exist, the H-LS 437 in the home network, and the V-LS 436 in the visited network. The WiMAX forum defines an interface between the H-LS 437 and V-LS 436 called the R5 interface 405. The WiMAX forum, however, does not define how location requests are sent across the R5 interface 405 other than they are RADIUS protocol messages or DIAMETER protocol messages.

It should be noted that there are several location determination methods supported by the above-described network architecture 400. For example, a device 410, which is equipped with GPS capability may utilize 802.16m MAC and PHY features to estimate its location when GPS is not available, e.g., indoors, or be able to faster and more accurately acquire GPS signals for location determination. The network 400 may make the GPS assistance data, including GPS Almanac data and Ephemeris data, available through broadcast and/or unicast air interface messages to the device 410. The delivery of GPS assistance data from the network 400 to devices 410 can be realized by enhanced GPS broadcast and/or unicast messages and enhanced LBS management messages. Assisted GPS ("A-GPS") may also be supported where an integrated GPS receiver and associated network components assist a GPS device to speed up GPS receiver "cold startup" procedure. For example, BSs 422, 423 may provide the device 410 with the GPS Almanac and Ephemeris information downloaded from GPS satellites. By having accurate, surveyed coordinates for the cell site towers, the BSs 422, 423 may also provide better knowledge of ionospheric conditions and other errors affecting the GPS signal than the device 410 alone, enabling more precise calculation of position.

Non-GPS-Based supported methods rely on the role of the serving and neighboring BSs or other components. For example, in a downlink ("DL") scenario, a device 410 may receive existing signals (e.g., preamble sequence) or new signals designed specifically for the LBS measurements, if it is needed to meet the requirement from the serving/attached BS and multiple neighboring BSs 422, 423. The BSs 422, 423 are able to coordinate transmission of their sequences using different time slots or different OFDM subcarriers. The device 410 accurately calculates the required measurements, even in the presence of multipath channel and heavy interference environment, and then estimates its location accordingly. In an uplink ("UL") scenario, various approaches may be utilized at the BSs 422, 423 to locate the device. Exemplary measurements are generally supported via existing UL transmissions (e.g., ranging sequence) or new signals designed specifically for the LBS measurements. Exemplary methods may include but are not limited to, TDOA, TOA, RTD, AOA, RSSI, Advanced forward link trilateration ("A-FLT"), Enhanced observed time difference ("EOTD"), Observed time difference of arrival ("OTDOA"), time of arrival ("TOA"), uplink-TOA and uplink-TDOA, Enhanced cell/sector and cell-ID, etc., and hybrid combinations thereof.

Figure 5:
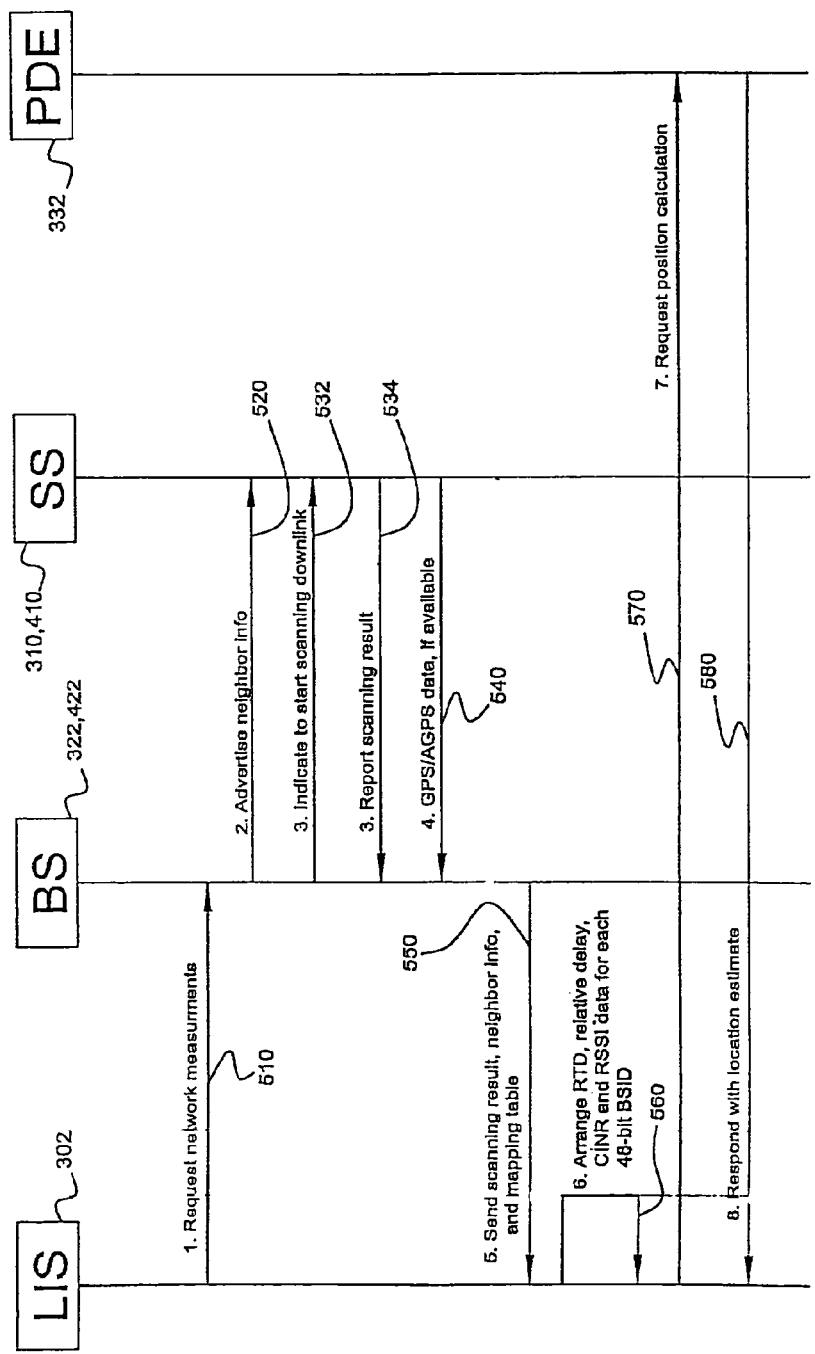
FIG. 5 is a diagram of a call flow according to one embodiment of the present subject matter.

FIG. 5 is a diagram of a call flow 500 according to one embodiment of the present subject matter. With reference to FIGS. 3-5, an LIS 302 may receive or supply a request for network measurement data to or from a BS 322, 422 at step 510. The BS 322, 422 may periodically transmit a MOB_NBR-ADV management message to identify the network and define the characteristics of neighboring BSs to a device or subscriber station 310, 410 at step 520. At step 532, the BS 322, 422 transmits a MOB_SCN-RSP message to trigger mobile scan reporting. The subscriber station 310, 410 may respond with a MOB_SCN-REP message including the RTD, relative delay, carrier to interference and noise ration ("CINR"), received signal strength indicator ("RSSI") measurements, among others, and any GPS or A-GPS data, if available, on the downlink at steps 534 and 540. At step 550, the BS 322, 422 may transmit the scanning result and neighboring BS information along with a mapping table. In certain embodiments, the mapping table may be needed to convert some of the BS indices into 48-bit Base Station IDs ("BSID"). At step 560, the LIS 302 may arrange the network measurement information for each 48-bit BSID, and at step 570 the LIS 302 may transmit the network measurement information to a PDE 332 to compute the location of the target subscriber station 310, 410. The PDE 332 may then respond with a location estimate of the target subscriber station 310, 410 at step 580.

In certain embodiments of the present subject matter, both network configuration parameters and dynamic measurement quantities may be needed for location determination. For example, any one or combination of the following BS related parameters may be utilized by an exemplary PDE to estimate the location of a target subscriber station: BSID, azimuth information for each sector, and/or latitude/longitude of each sector. Of course, these parameters are exemplary only and should not in any way limit the scope of the claims appended herewith. These parameters may be transmitted to the PDE periodically, by demand, and/or by event (e.g., when the network configuration changes). The subscriber station may also provide the following information: subscriber ID, RTD corresponding to the serving or anchor BS, OTDOA of detected downlink signals, CINR that may be utilized as weights of the measurements in an exemplary location computation algorithm, and/or RSSI. Again, these parameters are exemplary only and should not in any way limit the scope of the claims appended herewith. Relevant information may also be found in the Scanning Result Report (MOB_SCN-REP) message, e.g, BS CINR mean, BS RSSI mean, Relative Delay, BS RTD (for serving BS).

The exemplary information described above may be grouped into any number of information sets. For example, in one embodiment the information may be grouped into three sets such as N_current_BSs, N_Neighbor_BS_Index, and N_Neighbor_BS_Full. In this embodiment, a BS index to BSID mapping table (available to the BS) and the MOB_NBR-ADV message may be utilized to ascertain the full 48-bit BSID for the respective N_Neighbor_BS_Index set. While it is unnecessary for the PDE to have knowledge of these three sets, the PDE may require knowledge of the BSIDs to determine to which BS the set of measurements applies. For example, the data that the LIS may need to transmit to the PDE is shown below in Table 1.

TABLE 1

| Syntax | Notes |
| --- | --- |
| Subscriber ID | May be any type of identifier used between the serving base station, LIS and PDE. |
| numberOfDetectedBS | Total number of detected BS from the MOB_SCN-REP message |
| for (j=0; j< numberOfDetectedBS; j++) | |
| BSID | 48-bit BSID that uniquely identifies a BS; the following elements correspond to this BSID |
| CINR | BS CINR mean for the given BSID |
| RSSI | BS RSSI mean for the given BSID |
| relativeDelay | Relative Delay for the given BSID |
| RTD | BS RTD, if applicable, for the BSID |

Relative delays obtained from the mobile scanning report may be meaningful if the downlink transmission time is known. One embodiment of the present subject matter may synchronize the downlink frame markers of the base stations with GPS. In this embodiment, the relative delays may provide TDOA location hyperbolas without any timing compensation. In another embodiment, free running downlink frame markers may be utilized, that is, no GPS synchronization is used. In this embodiment, the downlink frame markers of the BSs may drift with time and synchronization may be achieved by using a timing bank method or network synchronization unit ("NSU") method. In the timing bank method, for A-GPS enabled subscriber stations, an accurate subscriber station location and subscriber station measurements may be obtained simultaneously. The timing offsets of the measured downlink signals at the time of measurement may be estimated from this data. In the event there exist several A-GPS enabled subscriber stations in the network and if these subscriber stations frequently report both GPS locations and subscriber station measurements, the timing drift may be tracked and synchronization achieved. In the NSU method, one or more NSUs may be deployed throughout the network at known locations to monitor the downlink transmission time. These NSUs may or may not be co-located with BSs, and the NSUs may be sparsely deployed in the network.

In one embodiment, the NSUs may be GPS trained whereby the respective NSUs collect downlink signals, correlate against the known transmitted codes in the signals, and determine the TOAs of the downlink frame markers. The discrete Fourier transform ("DFT") duality properties, time and frequency shifts, and circular convolution and multiplication may be utilized for detecting the TOA. An exemplary detection algorithm is provided below.

$$Y(k)=X(k)H(k)e^{(-j2\pi k \Delta n/N)} \quad (1)$$

With reference to Equation (1), X(k), in the frequency domain, represents a known pattern transmitted on the $k^{th}$ OFDMA downlink channel, H(k) represents a channel model for the $k^{th}$ channel, Y(k) represents a received signal at the NSU, $\Delta n$ represents timing shift in samples, and N represents the FFT size. Because of the propagation delay and different sampling instants of the signal, the received signal may be a time shifted version of the transmitted signal. From the time-frequency duality property of DFT, circular time shift may manifest as frequency shift in the received signal. Similarly, for the adjacent channel k−1, the received signal may be represented below.

$$Y(k-1)=X(k-1)H(k-1)e^{(-j2\pi(k-1)\Delta n/N)} \quad (2)$$

The detection metric, M(k), may thus be represented as:

$$M(k) = X(k)Y'(k) \cdot [X(k-1)Y'(k-1)]' \quad (3)$$
$$= [X(k)X'(k)] \cdot [X(k-1)X'(k-1)] \cdot [H'(k) \cdot H(k-1)]e^{(-j2\pi\Delta n/N)}$$

Adjacent channel responses are expected to be similar, and, therefore it follows that:

$$H(k) \approx H(k-1) \quad (4)$$

With the assumption represented by Equation 4, Equation 3 may be rewritten as:

$$M(k) \approx |X(k)|^2 \cdot |X(k-1)|^2 |H(k)|^2 e^{(-j2\pi\Delta n/N)} \quad (5)$$

With reference to Equation (5), the first two terms are generally known constants. The third term, H(k), may vary with channel condition and is representative of channel fading. The exponential provides a timing offset relative to an ideal sampling instant; therefore, the third and fourth terms together may provide detection quality and TOA of the downlink signal.

In another embodiment of the present subject matter, synchronization may be obtained as a function of GPS trained downlink signals having constant offsets between frame markers. For example, if BS clocks are GPS trained but the downlink frame markers are not aligned, a simplified timing bank or sparsely deployed NSU(s) may be utilized to achieve synchronization.

Figure 6:
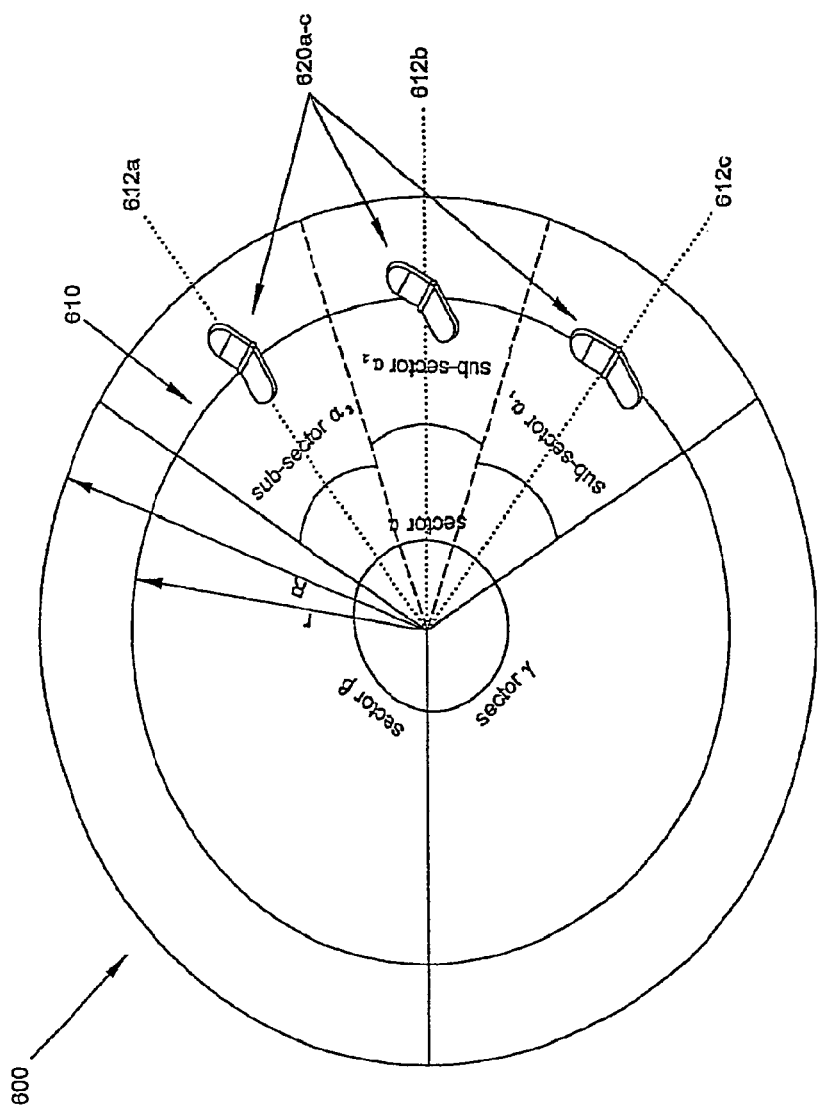
FIG. 6 is a diagram of one embodiment of the present subject matter.

Embodiments of the present subject matter may utilize any number of location computation algorithms or triangulation techniques depending upon the number of cells reported in the scanning report, For example, in the event that a scanning report includes only the RTD value of the serving BS, the intersection of a sector axis azimuth and an estimated range ring may be utilized as the mobile or subscriber station location. In this embodiment, the accuracy of the location estimation may be enhanced as a function of the CINR and/or RSSI. FIG. 6 is a diagram of one embodiment of the present subject matter. With reference to FIG. 6, the intersection of a range ring 610 and sub-sector axis 612a-c may be identified as the location(s) of the subscriber station 620a-c. A cell 600 of radius R may provide three sectors, α, β, and γ. The α sector may further be divided into three sub-sectors, α1, α2, and α3, which may or may not be equal. The estimated range of the mobile or subscriber station may be represented as r. As exemplary algorithm may be represented by the following pseudo-code:

If $(CINR)_\gamma$ is in the scanning report, but $(CINR)_\beta$ is not or is very weak
        Then choose the intersection of the range ring and the axis of sub-sector $\alpha_1$ as mobile's location
    Else if $(CINR)_\beta$ is in the scanning report, but $(CINR)_\gamma$ is not or is very weak
        Then choose the intersection of the range ring and the axis of sub-sector $\alpha_3$ as mobile's location
    Else choose the intersection of the range ring and the axis of sub-sector $\alpha_2$ as mobile's location.

Figure 7:
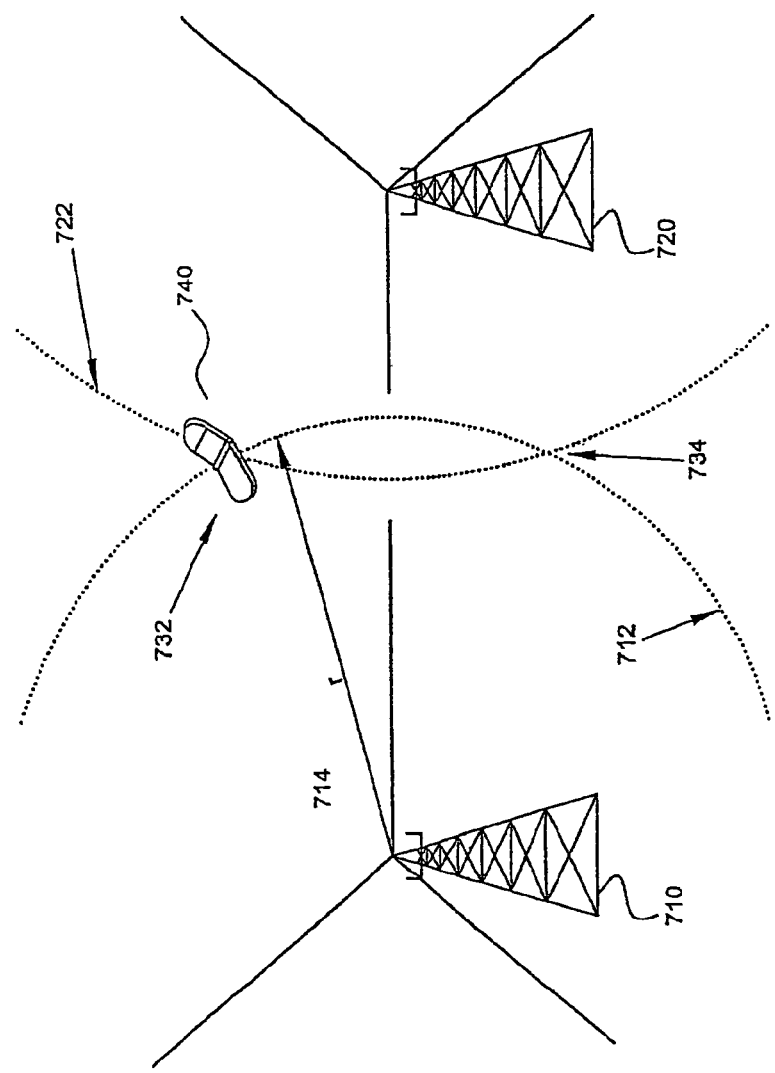
FIG. 7 is a diagram of another embodiment of the present subject illustrating location estimation with two site hearability and sector information.
Figure 8:
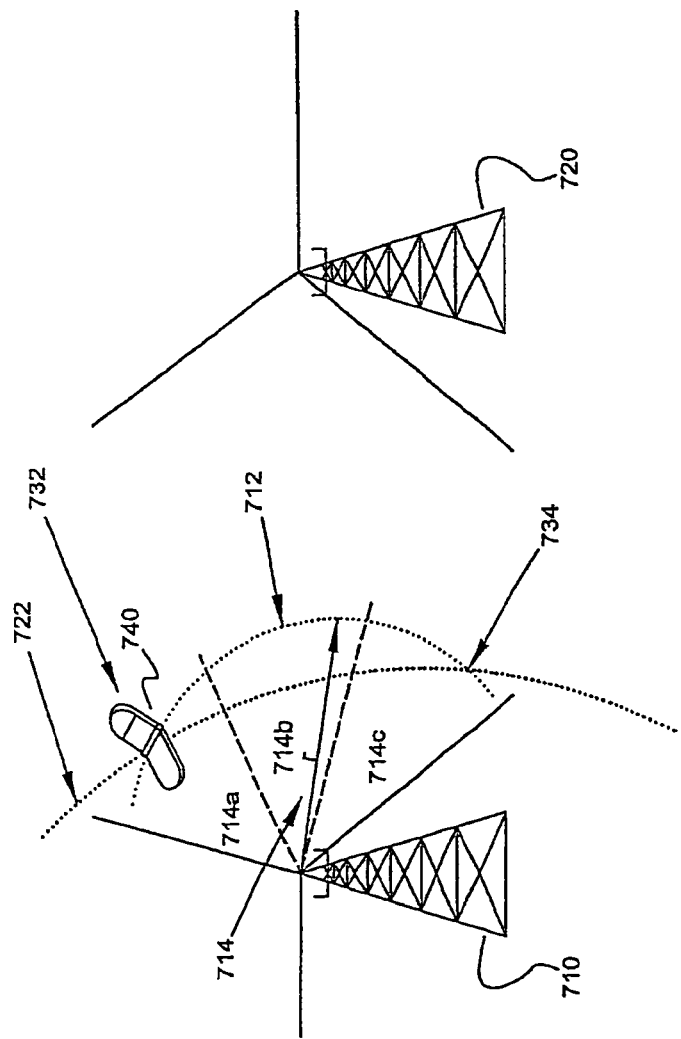
FIG. 8 is a diagram of a further embodiment of the present subject matter illustrating location estimation with two site hearability and sub-sector information.

Another exemplary location computation algorithm or triangulation technique may be employed in the event a scanning report is received from the serving BS and signals are received from only one neighboring BS. In this embodiment, suboptimal location determination algorithms may be developed when a single range ring and hyperbola are available. FIG. 7 is a diagram of another embodiment of the present subject illustrating location estimation with two site hearability and sector information. With reference to FIG. 7, a scanning report is received from a serving BS 710 from which an estimated range of the mobile or subscriber station may be determined and represented as a range ring 712 having a radius r. A hyperbola 722 may be determined as a function of signals received from a neighboring BS 720. In this embodiment, there will be at most two intersecting points 732, 734, one of which can be ruled out by observing the serving sector 714 geometry, that is, the intersecting point 732 inside the serving sector 714 represents the mobile or subscriber station's location 740, and the intersecting point 734 outside the serving sector 714 fails to represent the location of the subscriber station 740. In the event that both of the intersecting points 732, 734 lie within the serving sector 714, CINR measurements may be utilized to further divide the serving sector into sub-sectors and to identify the most likely location. FIG. 8 is a diagram of a further embodiment of the present subject matter illustrating location estimation with two site hearability and sub-sector information. With reference to FIG. 8, a scanning report may be received from the serving BS 710 from which an estimated range of the mobile or subscriber station may be determined and represented as a range ring 712 having a radius r. A hyperbola 722 may be determined as a function of signals received from the neighboring BS 720. In this embodiment, the two intersecting points 732, 734 are both in the serving sector 714; however, CINR measurements may be utilized to divide the serving sector 714 into sub-sectors 714a-c. For example, in one embodiment of the present subject matter, sub-sectors 714a-c may be determined as a function of a comparison of CINR measurements in the sector 714. The most likely sub-sector 714a of the serving sector 714 may be determined and the intersecting point 732 inside the most likely sub-sector 714a represents the mobile or subscriber station's location 740. In another embodiment, the most likely sub-sector 714a may be determined as a function of comparisons of the respective CINR measurements of the sub-sectors 714a-c. The intersecting point 734 outside the most likely sub-sector 714a fails to represent the location of the subscriber station 740. In the unlikely event where both of the intersecting points lie within the most likely sub-sector, or when none of the intersecting points lie in the most likely sub-sector, the sub-sector algorithm described with reference to FIG. 6 and subsequent exemplary pseudo-code may be utilized to ascertain the mobile or subscriber station location. In embodiments of the present subject matter that receive reports and/or signals from a serving BS and two or more neighboring BSs, standard triangulation algorithms with one range ring and two hyperbolas may be utilized.

Figure 9:
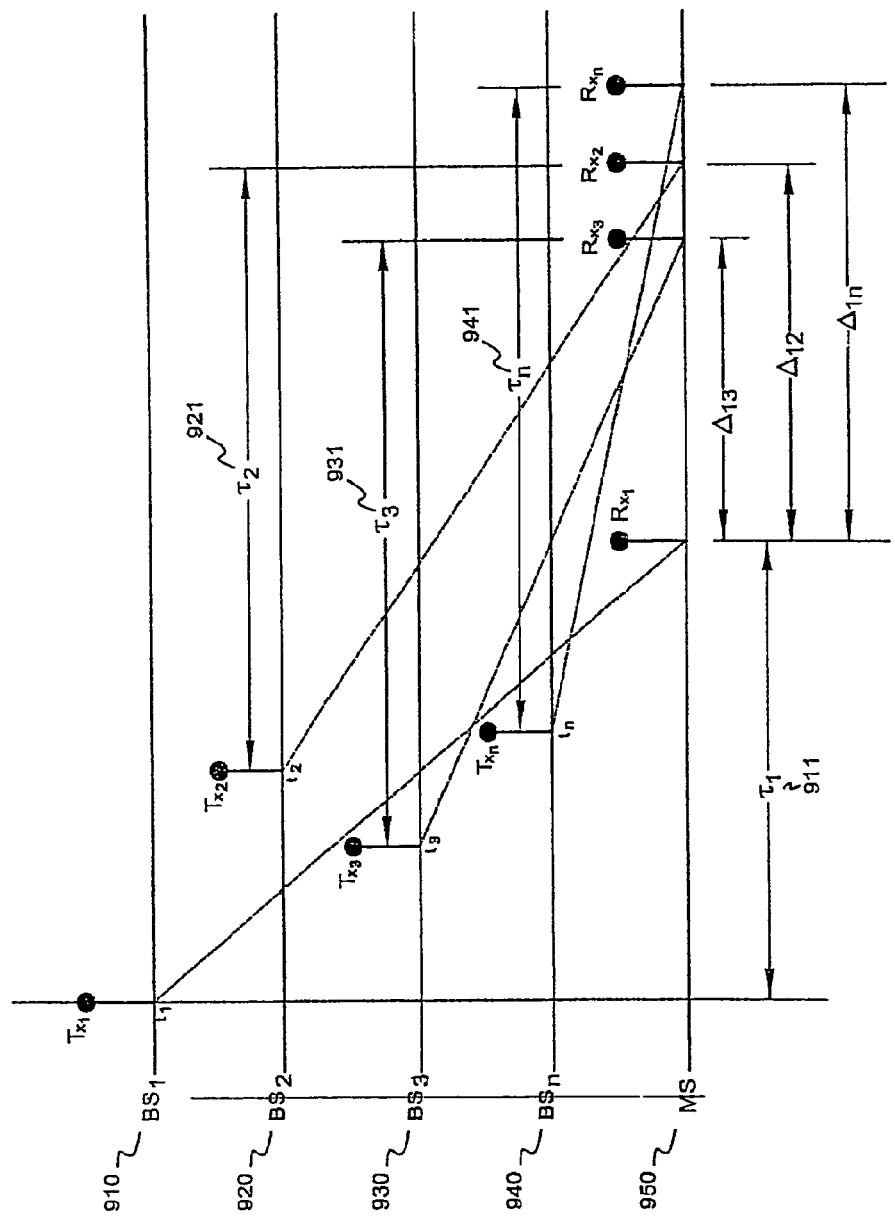
FIG. 9 is diagram of timing relationships in an embodiment of the present subject matter.

Embodiments of the present subject matter may be understood through the following explanation regarding timing relationships for WiMAX and/or LTE measurements. FIG. 9 is diagram of timing relationships in an embodiment of the present subject matter. With reference to FIG. 9, in one embodiment, $BS_1$ 910 may be a serving base station for a subscriber or mobile station MS 950. $BS_2$ 920, $BS_3$ 930, . . . , $BS_n$ 940 may be neighboring base stations having a signal detectable at the MS 950. Frame marker $Tx_1$ from $BS_1$ 910 is transmitted at time $t_1$, frame marker $Tx_2$ from $BS_2$ 920 is transmitted at time $t_2$, frame marker $Tx_3$ from $BS_3$ 930 is transmitted at time $t_3$, and frame marker $Tx_n$ from $BS_n$ 940 is transmitted at time $t_n$. $\tau_1$ 911 represents the propagation delay from the $BS_1$ 910 to the MS 950, $\tau_2$ 921 represents the propagation delay from the $BS_2$ 920 to the MS 950, $\tau_3$ 931 represents the propagation delay from the $BS_3$ 930 to the MS 950, and $\tau_n$ 941 represents the propagation delay from the $BS_n$ 940 to the MS 950. It follows that the downlink frame marker $Tx_1$ will be received $\tau_1$ seconds later at the MS 950 as $Rx_1$, the downlink frame marker $Tx_2$ will be received $\tau_2$ seconds later at the MS 950 as $Rx_2$, the downlink frame marker $Tx_3$ will be received $\tau_3$ seconds later at the MS 950 as $Rx_3$, and the downlink frame marker $Tx_n$ will be received $\tau_n$ seconds later at the MS 950 as $Rx_n$.

Defining the time difference of $Rx_2$, $Rx_3$, and $Rx_n$ relative to $Rx_1$ as $\Delta_{12}, \Delta_{13}, \ldots,$ and $\Delta_{1n}$, it follows that the MS 950 will report an RTD, $\Delta_{12}, \Delta_{13}, \ldots,$ and $\Delta_{1n}$ as the scanning result where RTD=$2\tau_1$. If the ranges of the MS 950 from the base stations 910-940 are denoted by $r_1, r_2, r_3, \ldots, r_n$, and if c represents the speed of light, the following relationships may be provided to represent the respective ranges:

$$r_1 = \tau_1/c = RTD/(2c) \quad (6)$$

$$r_2 = \tau_2/c = (\tau_1 + \Delta_{12} - (t_2 - t_1))/c \quad (7)$$

$$r_3 = \tau_3/c = (\tau_1 + \Delta_{13} - (t_3 - t_1))/c \quad (8)$$

$$\ldots$$

$$r_n = \tau_4/c = (\tau_1 + \Delta_{1n} - (t_n - t_1))/c \quad (9)$$

An estimated location of the MS 950 may be determined using the ranges calculated in the relationships above. The parameters $t_1, t_2, t_3, \ldots, t_n$, may be determined by an NSU or as a function of other synchronization techniques. In the event the number of available ranges is less than three, exemplary algorithms described above may subsector/sector algorithms described in the paragraphs above may be utilized to determine the most likely location of the MS 950. Additionally, standard multilateration techniques may be employed for three or more range rings and the techniques described in co-pending U.S. application Ser. No. 12/292,821, similarly assigned and incorporated by reference in its entirety, may also be employed in embodiments of the present subject matter.

The n equations (Equations 7-9) may also be solved using TDOA hyperbolas. For example, $h_{12}$ represents a hyperbola between $BS_1$ 910 and $BS_2$ 920, $h_{13}$ represents a hyperbola between $BS_1$ 910 and $BS_3$ 930, and $h_{1n}$ represents a hyperbola between $BS_1$ 910 and $BS_n$ 940, then the n equations may be rewritten as follows:

$$h_{12} = r_1 - r_2 = (-\Delta_{12} + (t_2 - t_1))/c \quad (10)$$

$$h_{13} = r_1 - r_3 = (-\Delta_{13} + (t_3 - t_1))/c \quad (11)$$

$$\ldots$$

$$h_{1n} = r_1 - r_n = (-\Delta_{1n} + (t_n - t_1))/c \quad (12)$$

While the two sets of equations may include substantially the same information, the implementation is different. For example, in Equations 7-9, n range rings are provided; however, in Equations 10-12, one range ring and (n−1) hyperbolas are provided. Embodiments of the present subject matter may utilize one or both sets and/or any combination of the above equations.

Figure 10:
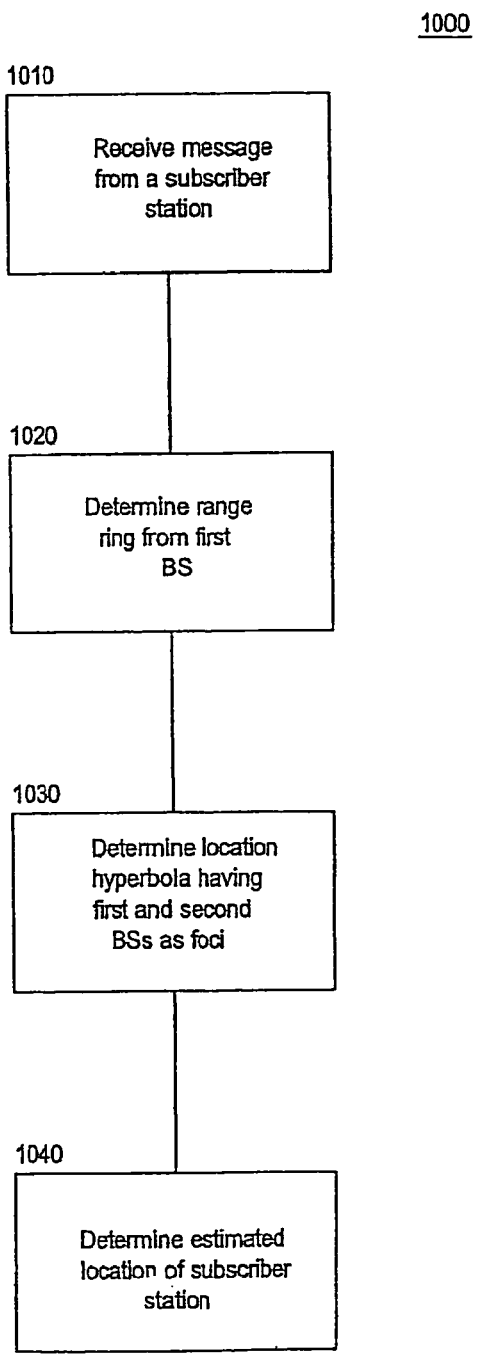
FIG. 10 is a schematic representation of an algorithm according to one embodiment of the present subject matter.

FIG. 10 is a schematic representation of an algorithm according to one embodiment of the present subject matter. With reference to FIG. 10, a method 1000 is provided for estimating a location of a subscriber station receiving a first signal from a first BS and receiving a second signal from a second BS where the first and second BSs are nodes in a WiMAX or LTE network. These signals may be synchronized to a common timing standard such as, but not limited to, a satellite navigation system timing standard. In embodiments including one or more NSUs, any number of which may be co-located with the BSs and/or may be sparsely arranged in the network, the NSU(s) may be synchronized to a timing standard and located at predetermined locations. In this embodiment, the timing standard may also be a satellite navigation system timing standard, and a TOA may be determined at the NSU for the first and second signals. In a further embodiment, plural additional subscriber stations may be operating in the network with each or several reporting their respective GPS locations and subscriber station measurements to the network to thereby allow the network to determine synchronization between the BSs.

The method 1000 may include at step 1010 receiving a message from the subscriber station, the message containing a first information and a second information, and at step 1020, determining a range ring from the first BS using the first information. In one embodiment, the message may be a scanning result report message. Further, the first information may include an RTD time value between the subscriber station and the first BS, and the second information may include a relative time delay value observed at the subscriber station between the first and second signals. In another embodiment, the message may also include additional information such as, but not limited to, a subscriber identification, a CINR value for at least one of the first and second BSs, and/or an RSSI value for at least one of the first and second BSs. Of course, these messages may be used by the WiMAX or LTE network for determining handoff operations for the subscriber station.

At step 1030, a location hyperbola may be determined using the second information where the location hyperbola has the first and second BS as foci. An estimated location of the subscriber station may be determined at step 1040 using the range ring and hyperbola. In one embodiment, the subscriber station may be A-GPS capable and the timing offset between the first and second signals may be determined from the subscriber station message and/or the respective location hyperbola determined based on the timing offset. In an additional embodiment, step 1040 may include determining a serving sector of the first BS for the subscriber station and estimating a location of the subscriber station as a point of intersection of the range ring and location hyperbola that is within the serving sector. In another embodiment, step 1040 may include determining a serving sector of the first BS for the subscriber station, and if the range ring and location hyperbola intersect plural times within the serving sector, (i) determining plural sub-sectors for the serving sector, (ii) determining from the message a CINR for each of a first and a second neighboring sector to the serving sector, (iii) determining a most likely sub-sector from the plural sub-sectors based on a comparison of the CINR for the first and second neighboring sectors, and (iv) estimating a location of the subscriber station as a point of intersection of the range ring and location hyperbola that is within the most likely sub-sector. In yet a further embodiment of the present subject matter, step 1040 may include determining a second location hyperbola using the second information wherein the second location hyperbola has the first BS and a third BS as foci, and estimating a location of the subscriber station using the range ring, location hyperbola, and the second location hyperbola.

Figure 11:
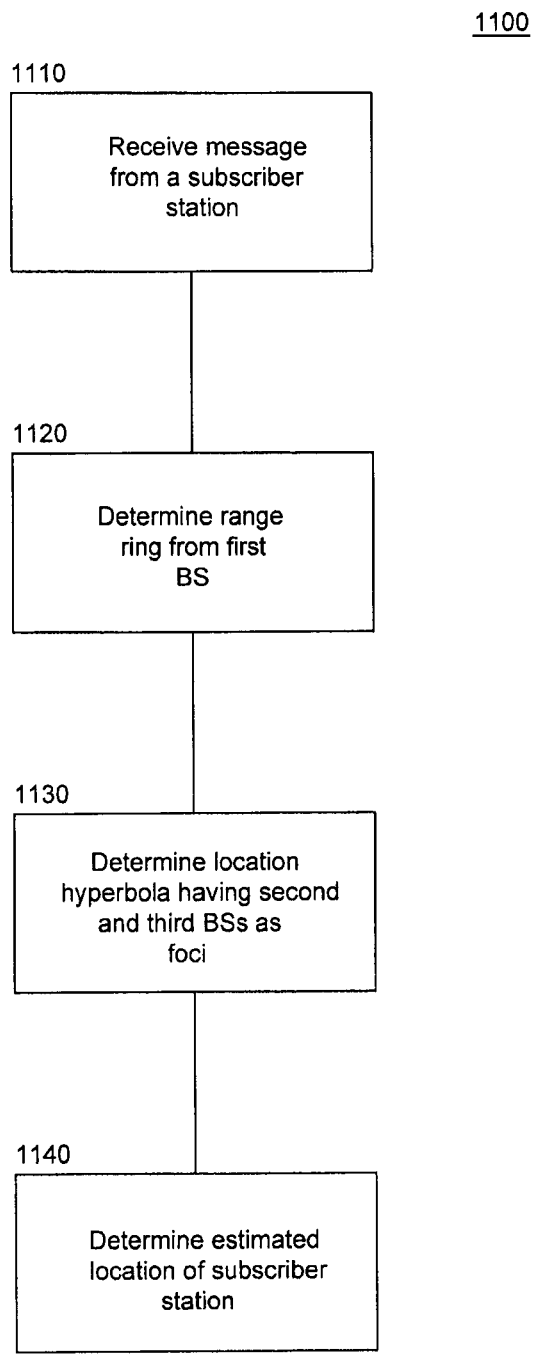
FIG. 11 is a schematic representation of an algorithm according to another embodiment of the present subject matter.

FIG. 11 is a schematic representation of an algorithm according to another embodiment of the present subject matter. With reference to FIG. 11, a method 1100 is provided for estimating a location of a subscriber station receiving a first signal from a first BS, receiving a second signal from a second BS, and receiving a third signal from a third BS where the first, second, and third BSs are nodes in a WiMAX or LTE network. The method 1100 may include, at step 1110 receiving a message containing a first information and a second information from the subscriber station, and at step 1120, determining a range ring from the first BS using the first information. At step 1130, a location hyperbola may be determined using the second information where the location hyperbola has the second and third BSs as foci. A location of the subscriber station may be estimated at step 1140 using the range ring and location hyperbola.

Figure 12:
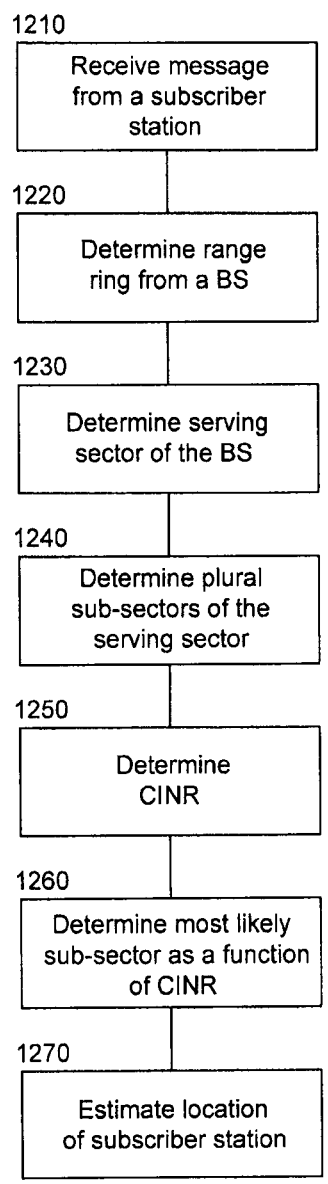
FIG. 12 is a schematic representation of an algorithm according to a further embodiment of the present subject matter.

FIG. 12 is a schematic representation of an algorithm according to a further embodiment of the present subject matter. With reference to FIG. 12, a method 1200 is provided for estimating a location of a subscriber station receiving a signal from a BS where the BS is a node in a WiMAX or LTE network. The method 1200 may comprise at step 1210, receiving from the subscriber station a message containing a first information and a second information, and at step 1220 determining a range ring from the BS using the first information. In one embodiment, the message may be a scanning result report message. Further, the first information may include an RTD time value between the subscriber station and the first BS. Of course, these messages may be used by the WiMAX or LTE network for determining handoff operations for the subscriber station. At step 1230, a serving sector of the base station may be determined for the subscriber station, and plural sub-sectors determined for the serving sector at step 1240. At step 1250, a CINR may be determined from the second information for each of a first and a second neighboring sector to the serving sector. In one embodiment, the CINR may be reported by the subscriber station periodically or by demand. At step 1260, a most likely sub-sector may then be determined from the plural sub-sectors based on a comparison of the CINR for the first and second neighboring sectors. At step 1270 a location of the subscriber station may be estimated as a point of intersection of the range ring and a bisector of the most likely sub-sector.

Figure 13:
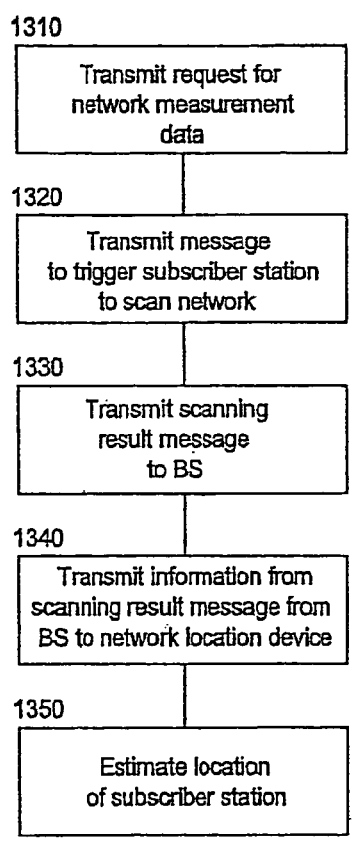
FIG. 13 is a schematic representation of an algorithm according to an additional embodiment of the present subject matter.

FIG. 13 is a schematic representation of an algorithm according to an additional embodiment of the present subject matter. With reference to FIG. 13, a method 1300 is provided for estimating a location of a subscriber station operating in a wireless network. The method 1300 may include transmitting from a network location device to a first BS a request for network measurement data at step 1310, and transmitting from the first BS to the subscriber station a message to trigger the subscriber station to scan the wireless network at step 1320. At step 1330, a scanning result message containing information characterizing the first BS and a second BS may be transmitted from the subscriber station to said first BS. In one embodiment, the scanning result message may further include a round trip time delay, a relative delay, a CINR, and/or an RSSI. At step 1340, information from the scanning result message may then be transmitted from the first BS to the network location device. A location for the subscriber station may then be estimated at the network location device based at least on the information from the scanning result message at step 1350. In one embodiment, step 1350 may include determining a range ring from the first BS, determining a location hyperbola having the first and second BSs as foci, and estimating a location of the subscriber station using the range ring and location hyperbola. Of course, any number of the steps described above and shown in FIGS. 10-13 may be implemented in the systems depicted in FIGS. 3-4 and 6-8.

By way of a non-limiting example, with reference to FIGS. 3 and 7, an exemplary system 300 is provided for estimating a location of a subscriber station 310 receiving a first signal from a first BS 322 and receiving a second signal from a second BS (not shown) where the first and second BSs are nodes in a WiMAX or LTE network. These signals may be synchronized to a common timing standard such as, but not limited to, a satellite navigation system timing standard. In embodiments including one or more NSUs 342, any number of which may be co-located with the BSs 322 and/or may be sparsely arranged in the network, the NSU(s) 342 may be synchronized to a timing standard and located at predetermined locations. In one embodiment, the timing standard may also be a satellite navigation system timing standard, and a TOA may be determined at the NSU 342 for the first and second signals. In a further embodiment, plural additional subscriber stations (not shown) may be operating in the network with each or several reporting their respective GPS locations and subscriber station measurements to the network to thereby allow the network to determine synchronization between the BSs.

The first BS 322 may include a receiver for receiving from the subscriber station 310 a message containing first and second information. The first information may include an RTD time value between the subscriber station 310 and the first BS 322, and the second information may include a relative time delay value observed at the subscriber station 310 between the first and second signals. In another embodiment, the message may also include additional information such as, but not limited to, a subscriber identification, a CINR value for at least one of the first and second BSs, and/or an RSSI value for at least one of the first and second BSs. Of course, these messages may be used by the WiMAX or LTE network for determining handoff operations for the subscriber station 310.

The system 300 may include circuitry at the LIS 302 and/or PDE 332 for determining a range ring from the first BS using the first information and circuitry at the LIS 302 and/or PDE 332 for determining a location hyperbola using the second information wherein the location hyperbola has the first and second BSs as foci. Further, the system 300 may include circuitry at the LIS 302 and/or PDE 332 for estimating a location of the subscriber station 310 using the range ring the said location hyperbola. In one embodiment, the subscriber station 310 may be A-GPS capable and the timing offset between the first and second signals may be determined from the subscriber station message and/or the respective location hyperbola determined based on the timing offset. In an additional embodiment, the system 300 may include circuitry for determining a serving sector of the first BS 322 for the subscriber station 310 and estimating a location of the subscriber station 310 as a point of intersection of the range ring and location hyperbola that is within the serving sector. In another embodiment, the system 300 may include circuitry for determining a serving sector of the first BS 322 for the subscriber station 310, and if the range ring and location hyperbola intersect plural times within the serving sector, (i) determining plural sub-sectors for the serving sector, (ii) determining from the message a CINR for each of a first and a second neighboring sector to the serving sector, (iii) determining a most likely sub-sector from the plural sub-sectors based on a comparison of the CINR for the first and second neighboring sectors, and (iv) estimating a location of the subscriber station 310 as a point of intersection of the range ring and location hyperbola that is within the most likely sub-sector. In yet a further embodiment of the present subject matter, the system 300 may include circuitry for determining a second location hyperbola using the second information wherein the second location hyperbola has the first BS 322 and a third BS (not shown) as foci, and estimating a location of the subscriber station 310 using the range ring, location hyperbola, and the second location hyperbola.

As another example and with reference to FIGS. 3 and 8, an exemplary system 300 is provided for estimating a location of a subscriber station 310 receiving a signal from a BS 322 where the BS 322 is a node in a WiMAX or LTE network. The BS 322 may include a receiver for receiving from the subscriber station 310 a message containing first and second information. In one embodiment, the message may be a scanning result report message. Further, the first information may include an RTD time value between the subscriber station 310 and the BS 322. Of course, these messages may be used by the WiMAX or LTE network for determining handoff operations for the subscriber station 310. The system 300 may include circuitry at the LIS 302 and/or PDE 332 for determining a range ring from the BS 322 using the first information, and include circuitry at the LIS 302 and/or PDE 332 for determining a serving sector of the BS 322 for the subscriber station 310, circuitry for determining plural sub-sectors for the serving sector, circuitry for determining from the second information a CINR for each of a first and a second neighboring sector to the serving sector, and circuitry for determining a most likely sub-sector from the plural sub-sectors based on a comparison of the CINR for the first and second neighboring sectors. Further, the system 300 may include circuitry at the LIS 302 and/or PDE 332 for estimating a location of the subscriber station 310 as a point of intersection of the range ring and a bisector of the most likely sub-sector.

As yet another example and with continued reference to FIGS. 3 and 7, an exemplary system 300 may be provided for estimating a location of a subscriber station 310 operating in a wireless network. The system 300 may include a network location device 302 having a first transmitter for transmitting to a first BS 322 a request for network measurement data. The first BS may include a second transmitter to transmit to the subscriber station 310 a message to trigger the subscriber station 310 to scan the wireless network. The subscriber station 310 may also include a third transmitter to transmit to the first BS 322 a scanning result message containing information characterizing the first BS 322 and a second BS (not shown). In one embodiment, the scanning result message may further include a round trip time delay, a relative delay, a CINR, and/or an RSSI. The first BS 322 may further include a fourth transmitter to transmit to the network location device 302 information from the scanning result message. In one embodiment the second and fourth transmitters may be the same. The system 300 may also include circuitry for estimating at the network location device 302 and/or PDE 332 a location for the subscriber station 310 based at least on the information from the scanning result message. In one embodiment, the network location device 302 and/or PDE 332 may include circuitry for determining a range ring from the first BS 322, circuitry for determining a location hyperbola having the first and second BSs as foci, and circuitry for estimating a location of the subscriber station 310 using the range ring and location hyperbola.

As shown by the various configurations and embodiments illustrated in FIGS. 1-13, a system and method for locating subscriber stations in a WiMAX or LTE network have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for estimating a location of a subscriber station operating in a wireless network, comprising the steps of:
    (a) transmitting from a network location device to a first base station a request for network measurement data;
    (b) transmitting from said first base station to said subscriber station a message to trigger said subscriber station to scan said wireless network;
    (c) transmitting from said subscriber station to said first base station a scanning result message containing information characterizing said first base station and a second base station;
    (d) transmitting from said first base station to said network location device information from said scanning result message; and
    (e) estimating at said network location device a location for said subscriber station based at least on said information from said scanning result message.

2. The method of claim 1 wherein said scanning result message includes a round trip time delay, a relative delay, a carrier to interference noise ratio, and a received signal strength indicator.

3. The method of claim 1 wherein the step of estimating a location for said subscriber station includes:
    (i) determining a range ring from said first base station;
    (ii) determining a location hyperbola having said first and said second base stations as foci; and
    (iii) estimating a location of said subscriber station using said range ring and said location hyperbola.

4. The method of claim 1 wherein signals sent from said first and second base stations are synchronized to a common timing standard.

5. The method of claim 1 wherein said subscriber station is an Assisted-Global Positioning System ("A-GPS") enabled subscriber station, and wherein a timing offset between said first and second signals is determined from said subscriber station message.

6. The method of claim 1 wherein plural additional subscriber stations are operating in said wireless network with each reporting their Global Positioning System ("GPS") locations and subscriber station measurements to said network to thereby allow said network to determine synchronization between said base stations.

7. A system for estimating a location of a subscriber station operating in a wireless network, comprising:
    (a) a network location device including a first transmitter for transmitting to a first base station a request for network measurement data;
    (b) said first base station including a second transmitter to transmit to said subscriber station a message to trigger said subscriber station to scan said wireless network;
    (c) said subscriber station including a third transmitter to transmit to said first base station a scanning result message containing information characterizing said first base station and a second base station;
    (d) said first base station including a fourth transmitter to transmit to said network location device information from said scanning result message; and
    (e) circuitry for estimating at said network location device a location for said subscriber station based at least on said information from said scanning result message.

8. The system of claim 7 wherein said scanning result message includes a round trip time delay, a relative delay, a carrier to interference noise ratio, and a received signal strength indicator.

9. The system of claim 7 wherein said circuitry for estimating a location for said subscriber station includes:
    (i) circuitry for determining a range ring from said first base station;
    (ii) circuitry for determining a location hyperbola having said first and said second base stations as foci; and
    (iii) circuitry for estimating a location of said subscriber station using said range ring and said location hyperbola.

10. The system of claim 7 wherein said second transmitter and said fourth transmitter are the same.

11. The system of claim 7 wherein signals sent from said first and second base stations are synchronized to a common timing standard.

12. The system of claim 7 wherein said wireless network is a World Interoperability Microwave Access or Long Term Evolution network.

13. The system of claim 12 wherein said World Interoperability Microwave Access or Long Term Evolution network includes a Network Synchronization Unit ("NSU") wherein said NSU is synchronized to a timing standard and located at a predetermined location.

14. The system of claim 13 wherein said World Interoperability Microwave Access or Long Term Evolution network includes a predetermined number N base stations and a predetermined number M NSUs wherein
    N>1 and N>M.

15. The system of claim 7 wherein said subscriber station is an Assisted-Global Positioning System ("A-GPS") enabled subscriber station, and wherein a timing offset between said first and second signals is determined from said subscriber station message.

16. The system of claim 7 wherein plural additional subscriber stations are operating in said wireless network with each reporting their Global Positioning System ("GPS") locations and subscriber station measurements to said network to thereby allow said network to determine synchronization between said base stations.

* * * * *